Aug. 14, 1962   P. A. MODELLE   3,048,945
APPARATUS FOR SHAPING MOUTH PORTIONS OF GLASS ARTICLES
Filed July 16, 1957   2 Sheets-Sheet 1

INVENTOR.
PHILIP A. MODELLE
BY W. A. Schaich &
E. J. Holler
ATTORNEYS

Aug. 14, 1962　　　P. A. MODELLE　　　3,048,945
APPARATUS FOR SHAPING MOUTH PORTIONS OF GLASS ARTICLES
Filed July 16, 1957　　　　　　　　　　　　　2 Sheets-Sheet 2

INVENTOR.
PHILIP A. MODELLE
BY H. A. Schaich &
E. J. Holler
ATTORNEYS

United States Patent Office 3,048,945
Patented Aug. 14, 1962
:::

3,048,945
APPARATUS FOR SHAPING MOUTH PORTIONS OF GLASS ARTICLES
Philip A. Modelle, Vineland, N.J., assignor to Kimble Glass Company, a corporation of Ohio
Filed July 16, 1957, Ser. No. 672,253
5 Claims. (Cl. 49—7)

The present invention relates to apparatus for exteriorly shaping mouth portions of glass articles such as glass vials and more particularly the invention pertains to a forming tool mechanism adapted to accurately finish the exterior surfaces of mouth and neck areas of glass articles during their conveyance in a lineal direction.

It has been found that when the open end of a glass vial has been shaped with the glass in plastic or workable condition while being moved along on a conveyor, irregular contours of the mouth and body portions may result. Also circular shaping of neck and mouth portions is frequently inadequate to achieve accurate dimensions thereof. Tools which have been primarily utilized heretofore have been of a type which retain the shaping jaws for the vial opening in relatively rigid mountings requiring the glass article to be moved into engagement therewith in very precise alignment for the shaping operation. These tools have been inadequate to allow for deviations in the horizontal and vertical positions of the moving vials as well as changes in the centers of the conveyed series of vials due to variation in their diameters. It must be understood that the individual vials which are ordinarily fabricated from relatively uniform lengths of glass tubing may vary slightly in diameter and the conveying medium such as an endless chain-type conveyor belt may bring the individual vials to the tooling station with their axial centers at slightly different elevations. In rotating vials through rigid shaping jaws while slightly off-center, the vial neck and mouth portions which are produced may be eccentrically and/or irregularly shaped and out of axial alignment with the vial body, which characteristics appreciably lower the quality of the glassware.

The difficulties of inadequate and improper alignment of the shaping jaws and the vial opening are overcome by the present invention, one of the general objects of which is to provide readily yieldable and adjustable glass shaping apparatus having a contoured pair of shaping jaws designed to impart the desired configuration to the vial opening.

Another object of the present invention is to provide a shaping tool which is adaptable to resilient vertical movement to automatically align itself with the axial center of the article blank to be shaped and which will simultaneously produce precisely formed glass articles having similar openings.

Another object of this invention is to provide a self-centering glass shaping mechanism which comprises a cantilevered resilient parallelogram having a pair of oppositely disposed shaping jaws on its free end, at least one of which is capable of individual yieldable movement. The apparatus is readily applicable to finishing the exterior surfaces of the mouth and neck portions of glass vials while they are conveyed in a linear direction in spaced-apart recumbent positions with the glass in workable condition to facilitate a single-pass mouth and neck forming operation.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the drawings the subject apparatus, as illustrated in a preferred embodiment, is especially suitable for exteriorly tooling the lip, mouth and neck portions of glass medicinal vials during their conveyance and while simultaneously rotated with an end portion of each vial acted upon by the apparatus. The invention is equally applicable to tooling greater or lesser surface areas of a wide variety of tubular glass articles of different diameters and is not to be considered as limited to the tooling of relatively small size glass vials except as defined by the scope of the appended claims.

Figure 1:
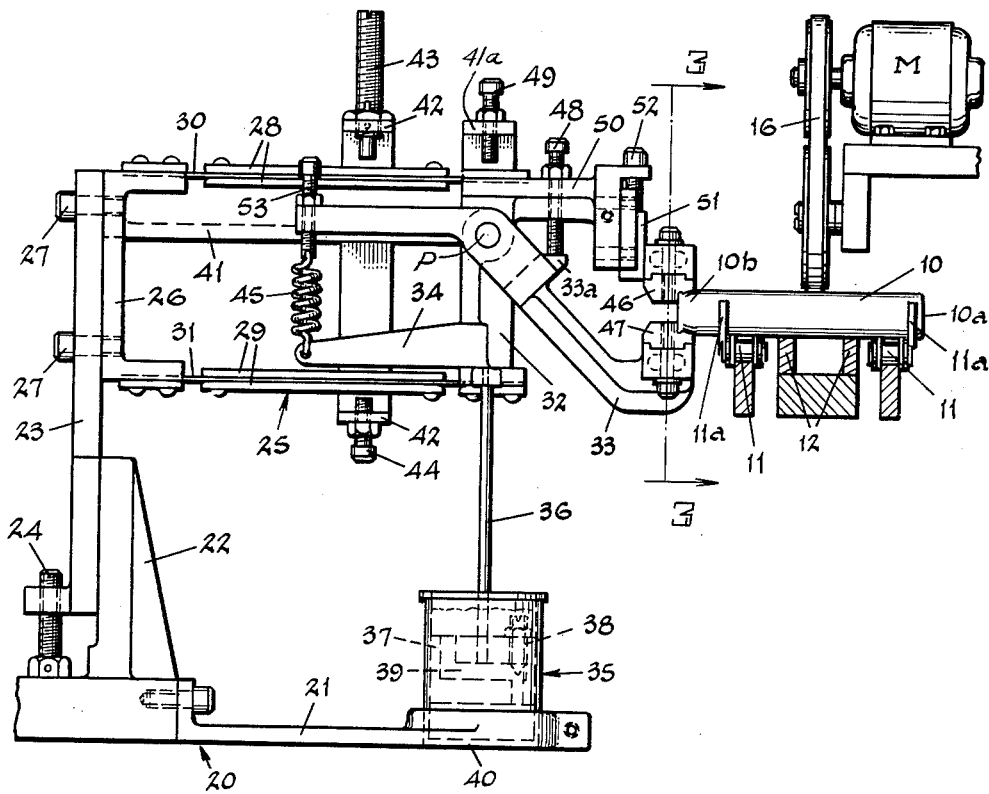
FIG. 1 is a front elevational view of the glass shaping apparatus embodying the present invention.
Figure 2:
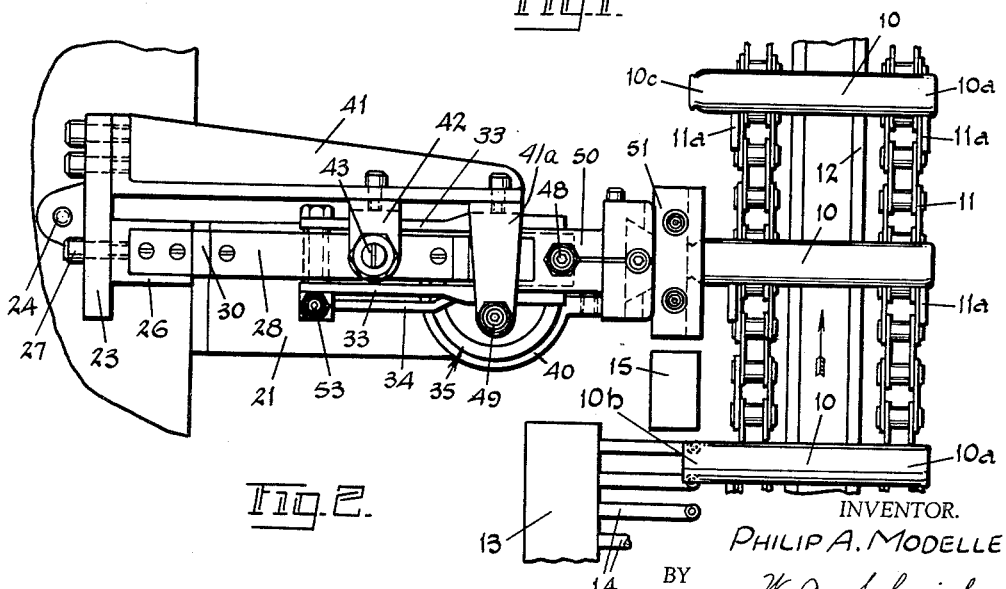
FIG. 2 is a top plan view of the apparatus and preliminary glass working elements without the vial rotating device shown in FIG. 1.
Figure 3:
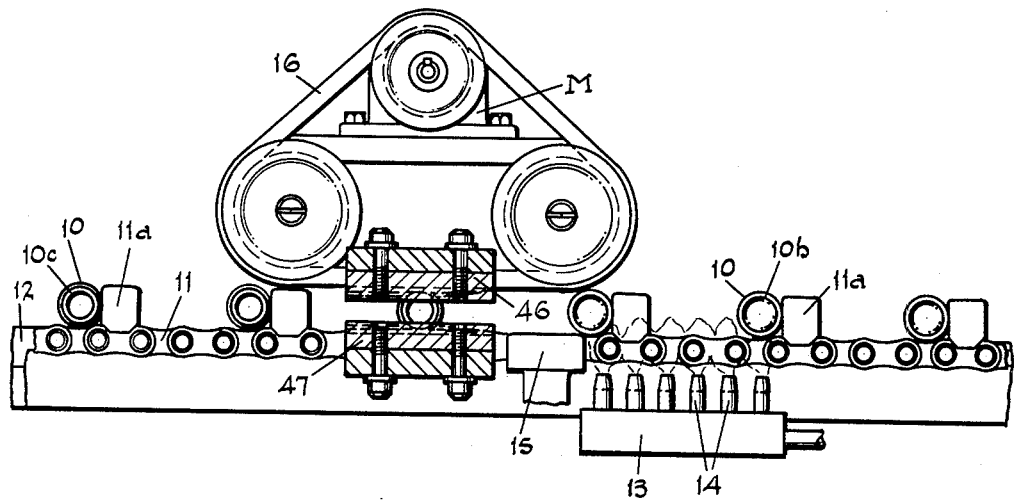
FIG. 3 is a vertical sectional view of the shaping jaws and vial rotating means taken along line 3—3 of FIG. 1.

As illustrated on FIGS. 1 and 2, the glass vials 10 are conveyed in a lineal direction in relatively uniform spaced-apart relationship in recumbent positions upon a conventional conveyor 11. The vials may be formed from suitable lengths of glass tubing, for example, which may differ slightly in diameter within certain acceptable limits. In the preliminary stages of fabricating vials 10, which does not constitute a necessary part of the present invention, the bottom portion 10a of each vial is closed while the glass is heat-softened to an elevated temperature and normally while the vial blanks are transported by conveyor 11 prior to the mouth forming operation.

The vials 10 are moved along further on conveyor 11 at a uniform rate by vertical lugs 11a contacting the vial side walls which rest upon stationary conveyor rails 12. The vials 10 are locally heated at their open ends 10b while being conveyed past a burner block 13 having a lengthwise series of burner nozzles 14 with gas flames directed upwardly at vial ends 10b. Thus, vial ends 10b are heat-softened into plastic or workable condition while being conveyed through the longitudinal series of burner fires. The vial ends 10b are then rolled over a stationary anvil 15 in the same plane as conveyor rails 12 which help to maintain and shape vial ends 10b into true cylindrical form.

An endless belt 16 is mounted above vials 10 with its rotational plane normal to conveyor 11 so that the belt may contact vials 10 in a central portion of their sidewalls for increasing their rate of rotation. Belt 16 normally travels at a faster rate and in the opposite direction to conveyor 11 to rotate and maintain the vials 10 against conveyor lugs 11a. Thus, increased rotational speed of the articles is utilized which is considerably faster than attainable by merely rolling the vials along on conveyor rails 12.

Belt 16 picks up the vials 10 during final stages of their end heating and continues their accelerated rotation until they have passed through and beyond the tooling jaws 46 and 47 of shaping apparatus 20. Endless belt 16 which may be composed of rubber encircles three rotatable pulleys arranged in a triangular pattern above conveyor 11, the lower two having their rotational axes in the same horizontal plane adjacent and in longitudinal alignment with the conveyor. Belt 16 is driven by an aligned upper pulley directly connected to an electrically powered motor M. The belt assembly is yieldable upwardly to conform to slight deviations in vial diameters.

Shaping apparatus 20 is mounted adjacent to and facing conveyor 11 with a portion thereof constituting the tooling or working region in alignment with vial ends 10b. Apparatus 20 has a base plate 21 of sufficient size to fully support the tooling mechanism. Base plate 21 has an upright section 22 to which is attached a vertically movable member 23, the two being joined by an interlocking tongue and groove. Member 23 is vertically adjustable on upright section 22 by a threaded bolt 24 cooperating with an opening in the bottom portion thereof.

A U-shaped member 26 is rigidly attached to the upper portion of member 23 by bolts 27. The two legs of member 26 reside in vertical alignment and extend over base plate 21 toward conveyor 11. Member 26 comprises a stationary vertical leg of regular parallelogram 25. Resilient arms 30 and 31 are attached to the two horizontally extending legs of U-shaped member 26 and extend in parallel relationship horizontally toward the conveyor. The opposite ends of arms 30 and 31 are joined to a rigid vertical leg member 32 comprising a cantilevered free end of rectangular parallelogram 25. Resilient arms 30 and 31 have double strap plates 28 and 29 respectively connected to their central portions of sufficient length to restrict their resilience. Arm members 30 and 31 may be composed of spring steel or other metallic alloy which will retain leg member 32 in yieldable cantilevered arrangement for limited vertical movement of the working elements of the apparatus.

A rigid horizontal arm 41 is connected to vertical member 23 adjacent and parallel to the upper portion of parallelogram 25. Arm 41 has two flanges 42 extending transversely to the vertical plane of parallelogram 25. Flanges 42 have upper and lower adjustment screws 43 and 44 adapted to contact the outer strap plates 28 and 29 on upper and lower sides of parallelogram 25 to limit its vertical movement. Arm 41 may also have another upper adjustment screw 49 for limiting the upper movement of rigid leg member 32. Rigid horizontal arm 41 has a laerally projecting portion 41a at its cantilevered end disposed in substantially vertical alignment with the upper end of upright leg member 32 for controlling its vertical movement as shown in FIGS. 1 and 2. Limit screw 49 is mounted in adjustable relation on laterally projecting portion 41a.

A so-called oil dash-pot 35 comprising a cylinder and piston is mounted below and in alignment with vertically movable rigid leg member 32 of parallelogram 25. Dash pot 35 is firmly restrained by a circularly curved split portion 40 of base plate 21. Dash pot 35 which is kept closed contains a fluid such as lubricating oil and a vertically operable piston 37. Piston 37 is connected to leg member 32 of the parallelogram by connecting rod 36 operatable through the cylinder head plate. Piston 37 has a channel 39 therein providing an opening between its faces with an adjustment valve 38 accessible from the outside on opening the cylinder for regulation of fluid flow through the piston 37 and thus its reactiveness.

Pivotally mounted about the central axis of member 32 is a partially yoked arm 33 which supports lower tooling jaw 47. Arm member 33 is pivotally mounted at an intermediate area thereof on a horizontal pivot pin designated by the letter P. The pivot pin is mounted in an upper region of leg member 32. Arm 33 is bifurcated throughout its left-hand portion as shown in FIG. 2 between pivot pin P and its interior end beneath upper resilient arm 30. The yoke portion of arm 33 extends laterally and interiorly on both sides of parallelogram 25 and is connected to horizontally extending section 34 of vertical leg member 32. Pivotable arm 33 has an adjustment screw 53 on its interior end which is connected to section 34 by a spring 45. Arm 33 has a stop flange 33a which is capable of acting against adjustment screw 48 on member 32 to control the highest level of tooling jaw 47 and thereby the minimum spacing between tooling jaws 46 and 47.

Vertical leg member 32 has an exteriorly extending upper portion 50 with a vertical groove in its outer extremity for supporting adjustable upper jaw holder 51 and an adjustment screw 52. Upper jaw 46 is firmly attached to jaw holder 51 by an interlocking tongue and groove. Tooling jaws 46 and 47 have horizontally disposed working faces which are similarly shaped lengthwise to form the desired neck and mouth contours during rotation of vial end portions 10b therethrough in workable condition. The vial blank receiving ends of jaws 46 and 47 are smoothly contoured divergently from their main shaping surfaces which extend uniformly through about two-thirds their length. The overall length of jaws 46 and 47 is normally greater than the circumference of the vials to be tooled to facilitate more than one revolution of each article during its passage, although with the articles being rotated, this is not a requirement.

The apparatus operates as follows:

After the heat-softened vial ends 10b are cylindrically shaped or maintained so by passage over stationary anvil 15, each vial is moved into initial engagement with tooling jaws 46 and 47. The resilient nature of the jaw mountings permit the parallelogram 25 to be moved upwardly or downwardly to automatically adjust the vial blank opening centrally between jaws 46 and 47. The jaw spacing is earlier established to produce the desired neck and mouth contours on all vials. The spacing between the jaws is immediately increased upon contact with vial end 10b with jaw 46 moving upwardly against the fluid pressure exerted by dash pot 35 while jaw 47 is moved downwardly against spring 45. Spring 45 is slightly distended at first as the vial is rotated about its own axis by endless belt 16 and carried through the jaws by conveyor lugs 11a. Shaping jaws 46 and 47 are moved together against the glass by the spring loading on arm 33, the resilient nature of the parallelogram, and the fluid pressure exerted by the dash pot which when in proper adjustment reduce the dimensions of vial end 10b to the prescribed minimum jaw spacing established by adjustment screws 48 and 52. This jaw centering and closing normally occurs by the time the vial passes half-way through the jaws depending largely upon the working temperature and composition of the glass. The vials discharge from between the jaws having precise lip, neck and mouth contours 10c which are truly circular and in proper axial alignment with the vial body.

Glass articles fabricated in accordance with the present invention have shown extremely high quality with a minimum of rejects due to eccentricity of neck and mouth portions or of axial misalignment of same with the article body. The neck and mouth portions of each vial have a precision finish readily adaptable to receive a suitable closure or stopper for containment of pharmaceutical preparations, for example.

Various modifications may be resorted to within the spirit and scope of the appended claims.

I claim:

1. Apparatus for exteriorly shaping open end portions of hollow glass articles such as vials during their conveyance, the said open end portions being in workable condition, said apparatus comprising a base member an upright rigid leg member attached to said base member, a pair of cantilevered resilient arm members disposed in vertical array each having one end attached to said rigid leg member, a second rigid leg member connecting the cantilevered free ends of said pair of resilient arm members adapted to limited vertical movement, a pivotally mounted arm attached to said second leg member, a pair of projecting vertically-spaced oppositely-disposed shaping jaws, one attached to a resilient arm member and the other attached to said pivotally mounted arm, said shaping jaws having working surfaces disposed in substantially horizontal parallel relation, the said jaws being movable vertically with respect to each other for self-centering contact with a conveyed individual glass article for its shaping thereby.

2. The apparatus in accordance with claim 1, including a second rigid arm member connected to said upright rigid leg member attached to said base member, said second rigid arm member projecting horizontally adjacent said pair of resilient arm members and having a pair of adjustable stop elements thereon for limiting vertical movement of said pair of shaping jaws.

3. The apparatus in accordance with claim 1, including a hydraulic unit mounted on said base member and connected to said second rigid leg member adapted to control the rate of vertical movement of said pair of shaping jaws.

4. The apparatus in accordance with claim 1, wherein said pair of shaping jaws having similar working surfaces of essentially greater length than the open-end circumference of said hollow glass articles.

5. Apparatus for shaping the open end portion of hollow glass articles such as vials and the like during their conveyance with the said end portion in workable condition, said apparatus comprising a base member, a primary upright rigid leg member attached to said base member, a pair of cantilevered resilient arm members disposed in vertical array each having one end attached to said primary leg member, a secondary rigid leg member connecting the other ends of said pair of resilient arm members adapted to limited vertical movement, a pivotally mounted arm disposed on said second rigid leg member, a pair of outwardly extending vertically-spaced oppositely-disposed shaping jaws one attached to a resilient arm member and the other attached to said pivotally mounted arm, said shaping jaws having working surfaces disposed in substantially horizontal parallel relation and having a length greater than the open-end circumference of said hollow glass articles, a rigid arm joined to said primary upright leg member and projecting horizontally adjacent said pair of resilient arm members adapted to limit the vertical movement of their cantilevered ends, and a hydraulic unit mounted on said base member connected to the said second rigid leg member to control the rate of vertical movement of said shaping jaws when contacting an individual glass article.

References Cited in the file of this patent

UNITED STATES PATENTS

| | | |
|---|---|---|
| 614,935 | Conde | Nov. 29, 1898 |
| 1,335,733 | Hagemeyer | Apr. 6, 1920 |
| 2,107,979 | Dichter | Feb. 8, 1938 |
| 2,367,495 | Gray | Jan. 16, 1945 |
| 2,661,576 | Gartner | Dec. 8, 1953 |
| 2,738,622 | Koenig | Mar. 20, 1956 |